F. D. MARIS.
SELF LAYING TWIN TRACTOR WHEEL.
APPLICATION FILED MAY 14, 1920.
1,388,737.
Patented Aug. 23, 1921.
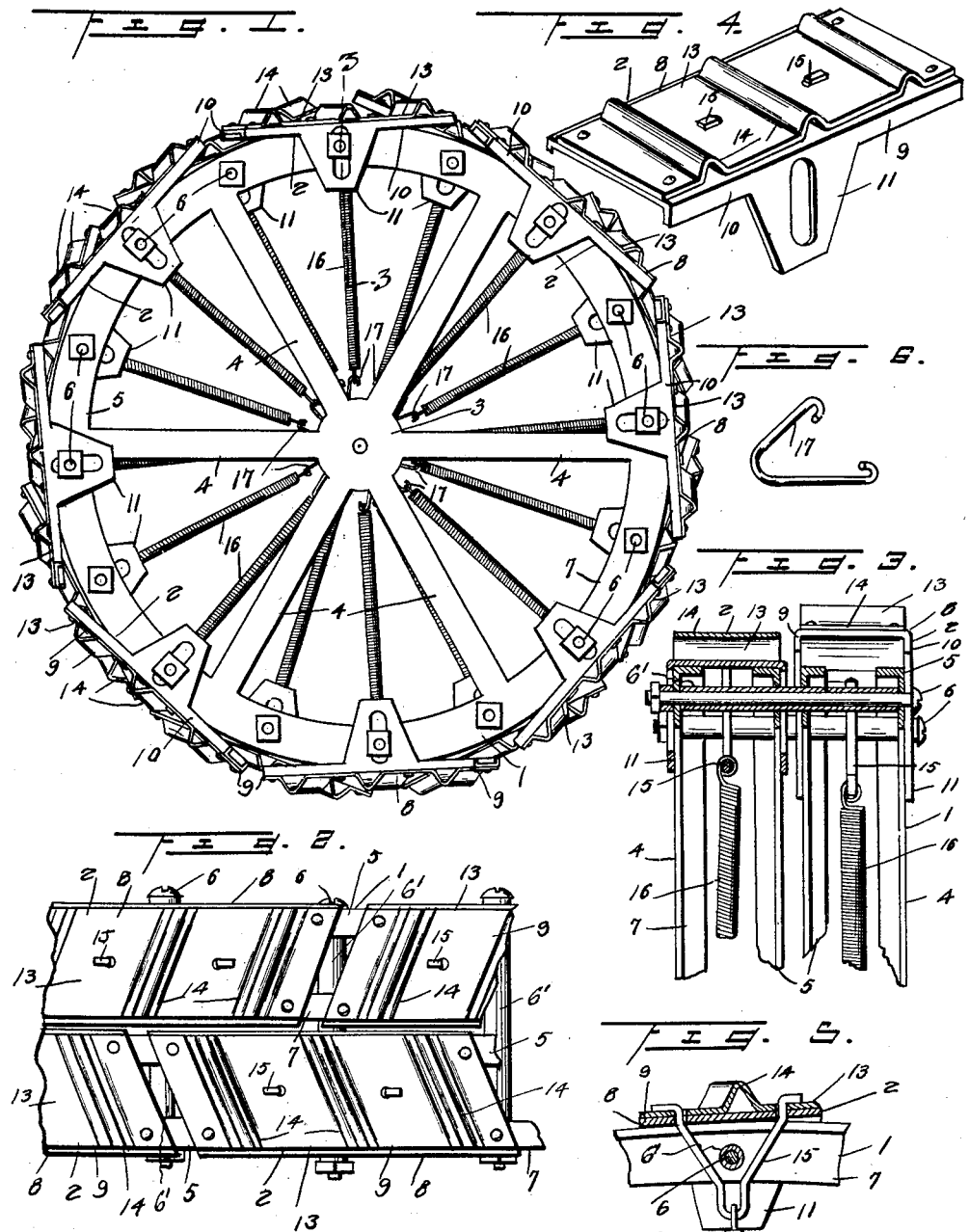
INVENTOR.
F. D. Maris.
BY
ATTORNEY.

UNITED STATES PATENT OFFICE.

FRED D. MARIS, OF TOPPENISH, WASHINGTON.

SELF-LAYING TWIN TRACTOR-WHEEL.

1,388,737. Specification of Letters Patent. Patented Aug. 23, 1921.

Application filed May 14, 1920. Serial No. 381,414.

*To all whom it may concern:*

Be it known that I, FRED D. MARIS, a citizen of the United States, residing at Toppenish, in the county of Yakima and State of Washington, have invented certain new and useful Improvements in Self-Laying Twin Tractor-Wheels; and I do hereby declare the following to be a full, clear, and exact description of the invention, such as will enable others skilled in the art to which it appertains to make and use the same.

This invention relates to new and useful improvements in traction wheels and more particularly to a tread therefor and has for its primary object the provision of a plurality of tread sections adapted to form a continuous track for the wheel to roll on, thereby providing a device that can readily obtain traction on soft ground and prevent skidding of said wheel.

Another object of this invention is the provision of means for connecting the tread sections to the wheel which will allow them to have relative movement in relation to said wheels so that they will adjust themselves flatly on the ground and form a continuous track for the wheel to bear on.

A further object of this invention is the provision of a self-laying twin tractor wheel of the above stated character, which shall be simple, durable and efficient, and which may be manufactured and sold at a comparatively low cost.

With these and other objects in view as will become more apparent as the description proceeds, the invention consists in certain novel features of construction, combination, and arrangement of parts as will be hereinafter more fully described and claimed.

For a complete understanding of my invention, reference is to be had to the following description and accompanying drawing, in which:—

Figure 1 is a side elevation, illustrating a traction wheel constructed in accordance with my invention, Fig. 2 is a top plan view of the same, Fig. 3 is a sectional view, taken on line 3—3 of Fig. 1, Fig. 4 is a perspective view of one of the tread sections.

Fig. 5 is a fragmentary sectional view illustrating the connection between one of the springs and one of the tread sections, Fig. 6 is a perspective view illustrating one of the substantially U-shaped connecting elements.

Referring in detail to the drawing, the numeral 1 indicates as an entirety a twin traction wheel having a self-laying track 2 and which includes a hub 3 having radial spokes 4 formed integrally with rims 5. The rims 5 are connected together by transversely extending bolts 6 so as to form a rigid construction. Sleeves 6′ surround the bolts 6 and space the wheels apart by abutment with the interior of the side flanges of rims 5. The rims 5 are slightly spaced from each other and each rim includes a pair of annular members 7 constructed from angle irons and having one of their flanges formed integrally with the spokes while the other flanges form the tread of the rims 5 and are relatively spaced from each other. The rims 5 have mounted thereon tread sections 8 and the tread sections of one of the rims 5 are alternately arranged with the tread sections on the other rim so that an overlapping arrangement is provided and also that the wheel 1 is continuously supported by said tread sections.

Each of the tread sections 8 consists of an elongated plate 9 that has flanges 10 formed on its side edges for engagement with the faces of the rims 5 and said flanges have formed thereon inwardly extending ears 11 provided with slots to slidably and pivotally connect the tread section to the rim by having the connecting bolts 6 pass through said slots. The plates 10 have secured to their outer faces wear plates 13, which have formed thereon non-skid ribs 14. The ribs 14 are preferably arranged to extend diagonally of said plates 10 and are formed by bending said wear plates. However these non-skid ribs may be formed by casting the ribs thereon, or if desired, calks or pins may be secured to said wear plates in lieu of the ribs 14.

Substantially U-shaped rod members 15 are secured to the plates 10 of the tread sections 8 by their terminals which are clenched against the interior of the plate to serve dually to secure rod members 15 in place and as tractive means. Rod members 15 straddle the connecting bolts 6 and have connected thereto the outer ends of springs 16. The springs 16 have their inner ends connected to the hub 3 by fastening elements 17 so that said tread sections are tensioned to automatically return to their normal position after tractive engagement with the road.

While I have shown and described the preferred embodiment of my invention, it will be understood that minor changes in construction, combination and arrangement of parts may be made without departing from the spirit and scope of the invention as claimed.

Having thus described my invention, what is claimed is:

1. A wheel of the class described having spaced rim members, traction elements movable radially thereof having side flanges overlapping the members, return springs, means depending from the elements through the space intermediate the rim members, said springs being connected to said means, fastening members extending transversely of the rims, said means being substantially U-shaped rods straddling said members and engaging the springs at their bridges, the free ends of the rods extending through and against the exterior of the elements for fastening and also to provide tractive projections.

2. A wheel of the class described having a movable traction element, a rod extending through the traction element having terminal means to secure it to the element and to serve as a tractive means, and a return spring secured to the rod.

In testimony whereof I affix my signature in presence of two witnesses.

FRED D. MARIS.

Witnesses:
  A. B. DORAN,
  E. L. DORAN.